US012573912B2

(12) United States Patent
Samuel

(10) Patent No.: US 12,573,912 B2
(45) Date of Patent: Mar. 10, 2026

(54) ROADWAY EMBEDDED RENEWABLE ELECTRICITY GENERATION SYSTEM

(71) Applicant: Ola Samuel, Zebulon, NC (US)

(72) Inventor: Ola Samuel, Zebulon, NC (US)

( * ) Notice: Subject to any disclaimer, the term of this patent is extended or adjusted under 35 U.S.C. 154(b) by 0 days.

(21) Appl. No.: 18/650,467

(22) Filed: Apr. 30, 2024

(65) Prior Publication Data
US 2024/0372434 A1 Nov. 7, 2024

Related U.S. Application Data

(60) Provisional application No. 63/463,952, filed on May 4, 2023.

(51) Int. Cl.
H02K 7/02 (2006.01)
H02J 7/00 (2006.01)
H02J 15/00 (2006.01)
(52) U.S. Cl.
CPC ............ H02K 7/025 (2013.01); H02J 7/0068 (2013.01); H02J 15/007 (2020.01)
(58) Field of Classification Search
CPC ....... H02K 7/025; H02J 15/007; H02J 7/0068
See application file for complete search history.

(56) References Cited

U.S. PATENT DOCUMENTS

| | | | |
|---|---|---|---|
| 2015/0115615 A1* | 4/2015 | Jang ........................ | F03G 7/083 |
| | | | 290/1 C |
| 2022/0049441 A1* | 2/2022 | Giannotta ............... | F03G 7/087 |
| 2022/0166289 A1* | 5/2022 | McIntosh ................. | F03G 3/08 |

* cited by examiner

*Primary Examiner* — Carlos Amaya
(74) *Attorney, Agent, or Firm* — Brennan, Manna & Diamond, LLC

(57) ABSTRACT

A roadway-embedded electric energy generation system is disclosed. In one embodiment, a pressure plate embedded with piezoelectric elements are disposed in a driveway/roadway/roadway and is coupled to pressure sensors. The pressure plate generates electricity when compressed by vehicle weights. The electricity generated is stored in a power storage module and managed via a control box that regulates power distribution to external grids or local utilities such as streetlights or electric vehicle charging stations. The system also includes a turbine generator to produce electricity. In another embodiment, the system includes a plurality of road energy tiles, each incorporating flywheel generators and activated by surface pressure due to compression of vehicle weights. The tiles are embedded into the driving surface and are connected to an energy storage and control module equipped with cooling mechanisms and power control functionalities.

17 Claims, 5 Drawing Sheets

ROADWAY EMBEDDED RENEWABLE ELECTRICITY GENERATION SYSTEM

CROSS-REFERENCE TO RELATED APPLICATION

The present application claims priority to, and the benefit of, U.S. Provisional Application No. 63/463,952, which was filed on May 4, 2023, and is incorporated herein by reference in its entirety.

FIELD OF THE INVENTION

The present invention generally relates to the field of renewable energy generation systems. More specifically, the present invention relates to novel roadway-embedded energy generator system. The system includes a pressure plate that compresses or moves to spin at least one generator below the roadway to generate electricity. The plate also includes piezoelectric material for generating electricity. In one embodiment, the system includes tiles having flywheel generators and the tiles are embedded into a driving surface and connected to an energy storage and control module equipped with cooling mechanisms and power control functionalities. Accordingly, the present disclosure makes specific reference thereto. Nonetheless, it is to be appreciated that aspects of the present invention are also equally applicable to other like applications, devices, and methods of manufacture.

BACKGROUND

By way of background, traditional fossil fuels have been used for a long time for generating electricity for grids and other requirements. However, fossil fuels are finite and contribute to greenhouse gas emissions, leading to global warming. From the last decade, renewable sources of energy have started to replace fossil fuels for producing electric power. For example, hydro plants are replacing thermal power plants very rapidly. However, implementing large-scale renewable energy projects often requires significant land, money, or changes to existing infrastructure.

Currently, solar energy and wind energy are two major types of renewable energy that are used in major parts of the world. However, availability of these sources is not always possible which decreases the reliability of the sources. Use of existing renewable sources is centralized and is difficult to produce and source locally on small scale easily. Accordingly, diversification of energy sources is vital for energy security.

Vehicles when run on driveways and roadways produce a lot of kinetic and mechanical energy. The mechanical energy produced by the vehicles is largely dissipated as heat and sound. Also, there isn't an existing system for using the kinetic energy of vehicles for producing electricity. Individuals desire a system that can use kinetic energy of vehicles to produce electricity, thereby reducing reliance on non-renewable sources and existing renewable sources.

Therefore, there exists a long felt need in the art for an electric energy generation system that captures energy from vehicle movement. There is also a long felt need in the art for an improved electric energy generation system that reduces reliance on non-renewable sources and existing renewable sources. Additionally, there is a long felt need in the art for an energy generation system that recycles kinetic energy of vehicular movement into electricity. Moreover, there is a long felt need in the art for a novel electric power generation system that can be integrated into the current road infrastructure and implemented within existing city layouts without additional land use. Further, there is a long felt need in the art for an energy-generating technology that can be embedded into roadways. Furthermore, there is a long felt need in the art for a new source of renewable energy that can be applied to an existing structure that is already common in society. Finally, there is a long felt need in the art for a novel clean energy source that can be implemented into roadways for capturing energy from vehicle movement and converting it into electricity.

The subject matter disclosed and claimed herein, in one embodiment thereof, comprises a roadway-embedded electric energy generation system designed to generate electrical power from kinetic energy of vehicles. The system includes a piezoelectric material embedded pressure plate constructed in a portion of a driveway or roadway, the pressure plate creates electric power when pressure is applied by moving vehicles thereon, a turbine generator disposed inside the driveway/roadway is adapted to rotate when the pressure plate moves, a power storage for storing electric power produced by the plate and the generator, and a control module to optimize the charging and discharging of the battery pack included in the power storage.

In this manner, the roadway-embedded electric energy generation system of the present invention accomplishes all of the forgoing objectives and provides users with a novel system that captures energy from vehicle movement and converts it into electricity. The system is scalable and can be implemented on a small scale, like a single stretch of road, and potentially scaled up to national highway systems. The system integrates into the current road infrastructure and can be implemented within existing city layouts without additional land use. The system provides a cost-effective alternative to the solar energy and wind energy for local use.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a roadway embedded energy conversion system. The system includes a plurality of road energy tiles embedded into at least a portion of a driving surface. Each of the road energy tiles includes at least one flywheel generator adapted to be activated by surface pressure induced by vehicles passing over the tiles. An energy storage and control module are disposed adjacent to the driving surface, the module includes one or more batteries for storing electrical power generated by the road energy tiles.

In yet another embodiment, a modular roadway energy system is disclosed. The system comprises a plurality of triangular road energy tiles continuously disposed to form a grid on a driving surface, each tile has a flywheel generator at each vertex. A connector for coupling each flywheel generator to an energy storage and control module, wherein the energy storage and control module is configured to store electrical energy generated by the flywheel generators and includes a manual activation mechanism operable by authorized personnel.

In another aspect, a road-embedded energy generation system is disclosed. The system further comprises a pressure plate embedded within a driving surface and coupled to at least one pressure sensor, a turbine generator adapted to be activated by pressure exerted on the pressure plate by vehicles, and a power storage module for storing electricity generated by the turbine generator and by piezoelectric material embedded in the pressure plate.

In yet another embodiment, a roadway system designed to generate electrical power from kinetic energy of vehicles is disclosed. The system includes a piezoelectric embedded pressure plate constructed in a portion of a driveway or roadway, a power storage for storing electric power produced by the plate, and a control module to optimize the charging and discharging of the battery pack included in the power storage.

In still another embodiment, the pressure plate is embedded into a driving surface, at least four pressure sensors are disposed within the driving surface and are operatively coupled to the pressure plate, the pressure plate includes piezoelectric elements configured to generate electrical energy upon compression by mechanical forces exerted by vehicles, a power storage module stores the electrical energy, and a control box is configured to monitor and control the flow of electricity from the power storage module to a grid or other power-consuming devices. The pressure sensors are configured to measure the amount of pressure applied to the pressure plate and assess the efficiency and amount of power generated by the pressure plate.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
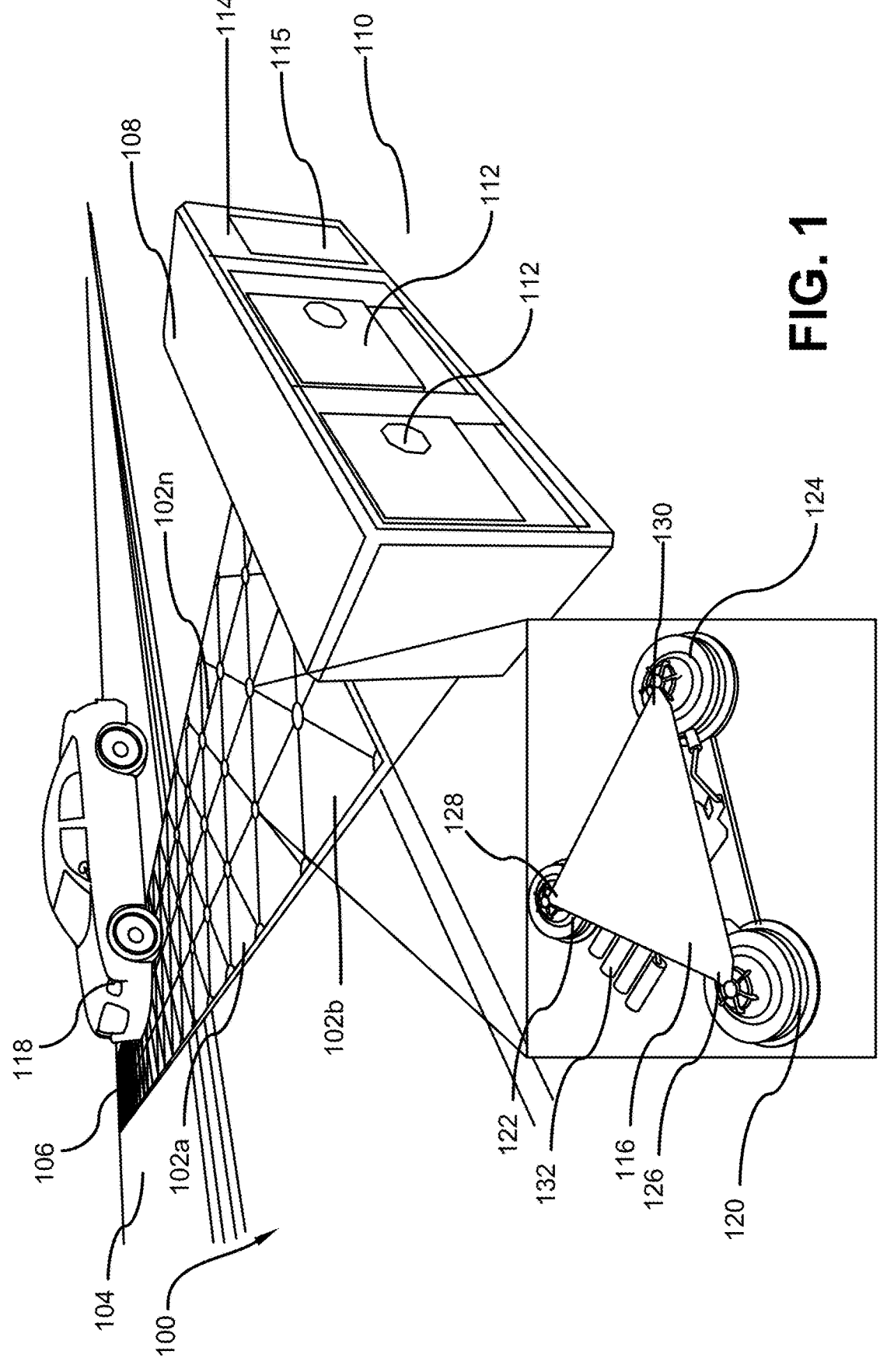
FIG. 1 illustrates a perspective view of one potential embodiment of the roadway-embedded electric energy generation system of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an electric energy generation system that captures energy from vehicle movement. There is also a long felt need in the art for an improved electric energy generation system that reduces reliance on non-renewable sources and existing renewable sources. Additionally, there is a long felt need in the art for an energy generation system that recycles kinetic energy of vehicular movement into electricity. Moreover, there is a long felt need in the art for a novel electric power generation system that can be integrated into the current road infrastructure and implemented within existing city layouts without additional land use. Further, there is a long felt need in the art for an energy-generating technology that can be embedded into roadways. Furthermore, there is a long felt need in the art for a new source of renewable energy that can be applied to an existing structure that is already common in society. Finally, there is a long felt need in the art for a novel clean energy source that can be implemented into roadways for capturing energy from vehicle movement and converting it into electricity.

The present invention, in one exemplary embodiment, is a roadway embedded energy conversion system. The system includes a plurality of road energy tiles embedded into at least a portion of a driving and/or roadway surface. Each of the road energy tiles includes at least one flywheel generator adapted to be activated by surface pressure induced by vehicles passing over the tiles. An energy storage and control module are disposed adjacent to the driving surface, the module includes one or more batteries for storing electrical power generated by the road energy tiles.

Referring initially to the drawings, FIG. 1 illustrates a perspective view of one potential embodiment of the roadway-embedded electric energy generation system of the present invention in accordance with the disclosed structure. The roadway-embedded electric energy generation system 100 is designed as a renewable energy generation system that collects the kinetic energy of the vehicles and converts it into electrical power. The system 100 is embedded into a driving surface such as a road or highway and preferably during construction of the driving surface.

The system 100 includes a plurality of road energy tiles 102*a-n* (hereinafter referred to as 102) embedded into at least a portion 106 of the driving surface 104. The road energy tiles 102 are continuously disposed to form a continuous grid on the portion 106 of the driving surface 104. The road energy tiles 102 are coupled to an energy storage and control module 108 disposed on a side 110 of the driving surface 104. The module 108 preferably includes one or more batteries 112 for storing the electric power generated by the road energy tiles 102.

The energy storage and control module 108 includes a cooling space 115 for preventing overheating of the batteries 112 and can be in the form of a fan. The module 108 is designed to be connected to an external grid or power receivers for receiving stored electric power from the module 108. Preferably, the batteries 112 are used for powering streetlights, traffic signals, or electric vehicle charging stations. The module 108 includes power buttons 114 for manually activating and deactivating the system 100 and authorized personnel such as a government official can operate the power button 114. In some embodiments, the system 100 is automatically deactivated when the batteries 112 are fully charged or in case one of the road energy tiles 102 is malfunctioned.

The system 100 does not use any fossil fuel and generates clean energy from the kinetic energy of moving vehicles or pedestrians over the portion 106 of the driving surface 104. The road energy tiles 102 are made of durable and tough materials and do not break when a heavy vehicle such as a truck drives over the road energy tiles 102. The system 100 is modular and the road energy tiles 102 can be embedded in multilane highway and even in small and narrow roads.

As illustrated, when pressure on the top surface 116 of a tile is applied such as when a vehicle 118 passes through the tile surface 116, the surface pressure activates (i.e., actuates) the three flywheel generators 120, 122, 124. Each energy tile is preferably triangular and includes a flywheel generator at each of the vertices 126, 128, 130. The flywheel generators 120, 122, 124 are mounted to the vertices 126, 128, 130 and are coupled to corresponding connectors 132 for connection with the energy storage and control module 108. The size and design of the triangular tile can be customized to the size of the driving surface upon which the driveway embedded renewable energy generation system 100 is to be installed and also based on the amount of electric power required from the kinetic energy of the vehicle passing on the tiles.

Each flywheel generator is adapted to spin using the pressure applied on the top surface 116 and stores rotational energy. The stored rotational energy is used for generating the electric power by the energy storage and control module 108. The flywheel generators 120, 122, 124 provide quick-response energy storage and do not cause loss of power in storing and converting into electric power.

Figure 2:
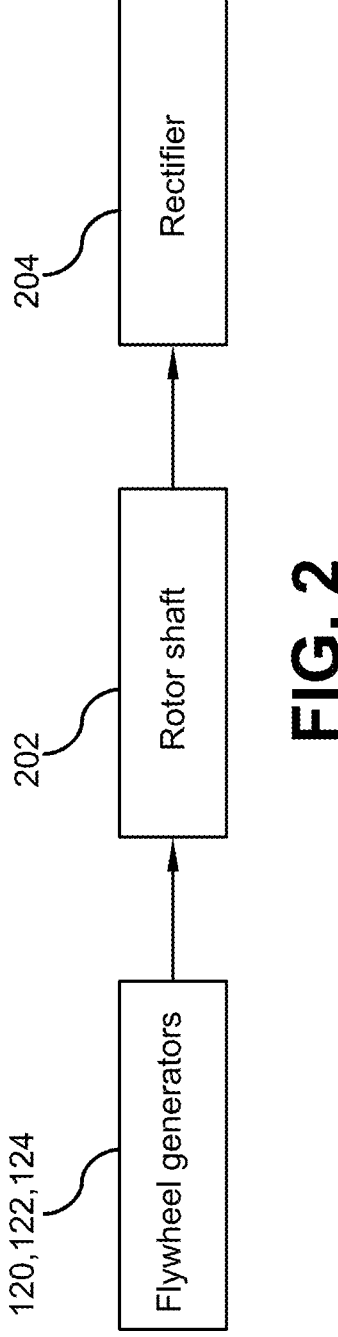
FIG. 2 illustrates a schematic view of the roadway-embedded electric energy generation system of the present invention in accordance with the disclosed structure.

FIG. 2 illustrates a schematic view of the roadway-embedded electric energy generation system of the present invention in accordance with the disclosed structure. As illustrated, the flywheel generators 120, 122, 124 of the tiles 102 are coupled to a rotor shaft 202 of the system 100. The rotational motion of the flywheel generators 120, 122, 124 turns the rotor shaft 202 within a magnetic field. Electromagnetic induction occurs as the rotor shaft 202 turns/spins within the magnetic field. The process generates an electrical current in the wires of the rotor due to the changing magnetic flux. The generated electrical current is in the form of alternating current (AC) and the AC output can be converted to DC using a rectifier 204. The generated electricity is then stored in batteries 112 for further usage and use with external grids, and more.

Figure 3:
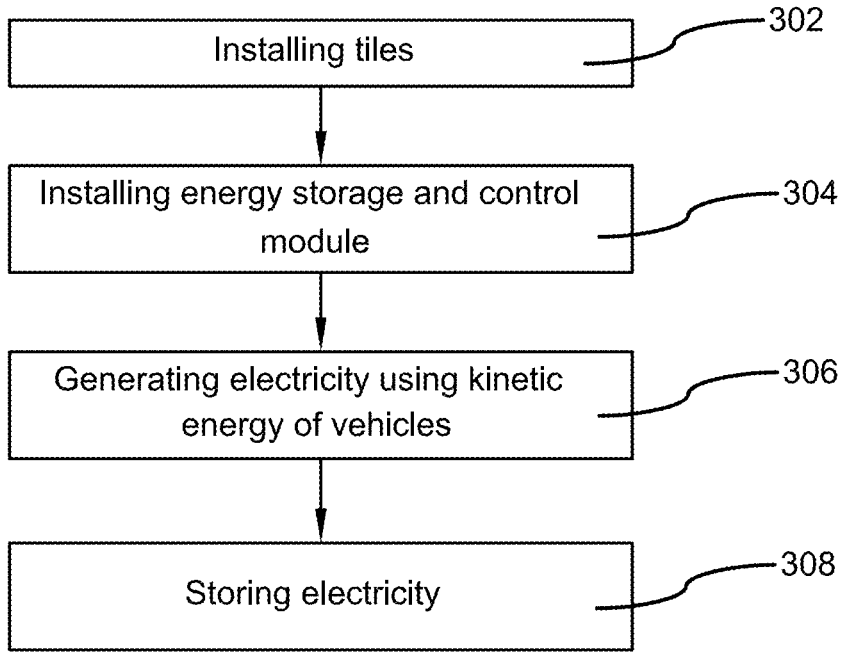
FIG. 3 illustrates a flow chart depicting a process of using the road energy system of FIG. 1 in accordance with the disclosed structure.

FIG. 3 illustrates a flow chart depicting a process of using the road energy system of FIG. 1 in accordance with the disclosed structure. Initially, the tiles 102 are installed in a driveway/roadway during construction of the driveway/roadway (Step 302). Then, the energy storage and control module 108 is installed on the side of the driveway/roadway such that the distance between the tiles 102 and the module 108 is minimized, thereby preventing energy loss (Step 304). Thereafter, when vehicles pass over the tiles 102, the flywheel generators along with the rotor shaft produce electricity which is stored in the batteries (Step 306). Finally, the stored energy is retrieved as per preferences of the users and can be used for electric vehicle chargers, driveway lights, and more (Step 308).

Figure 4:
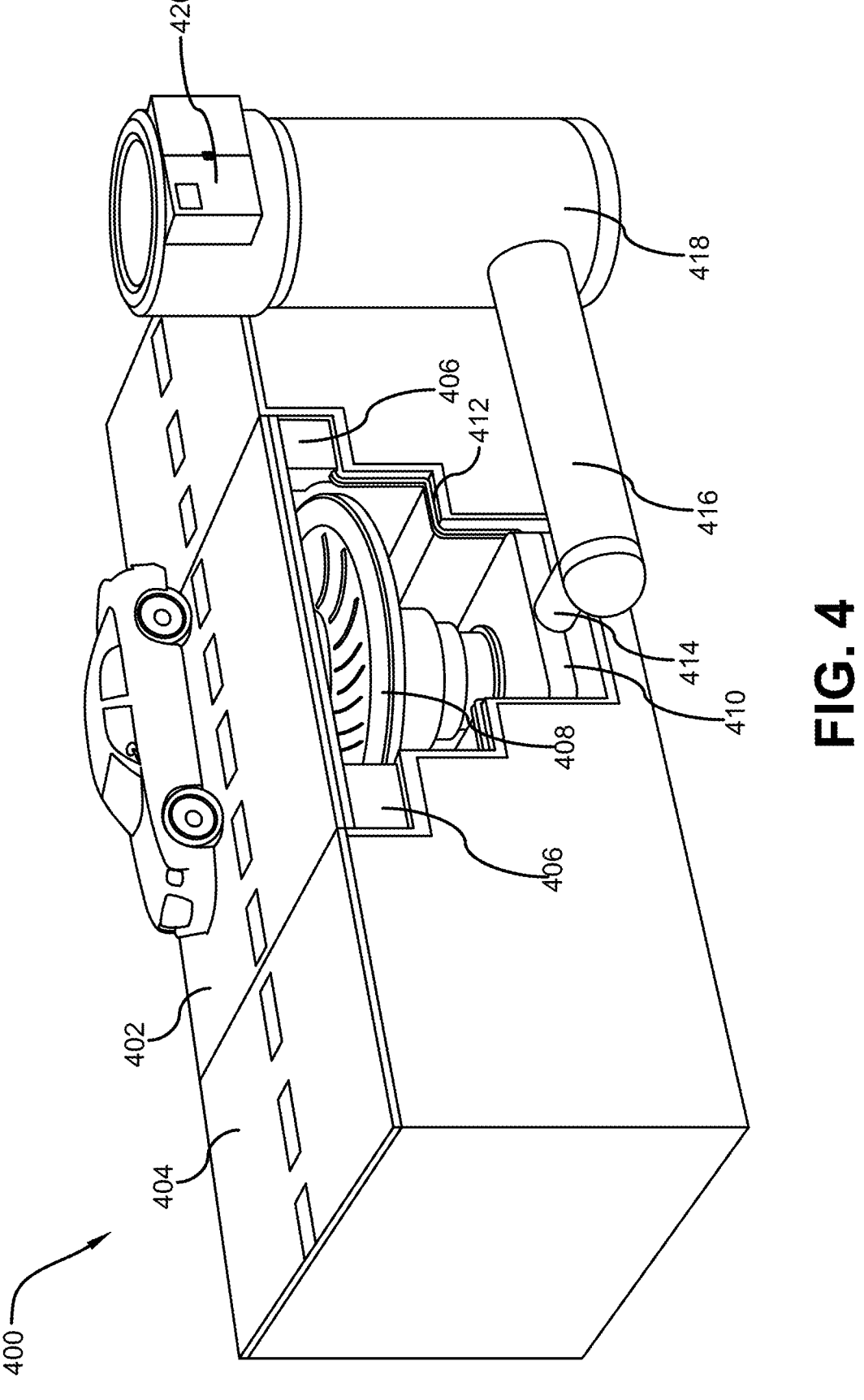
FIG. 4 illustrates another embodiment of the road energy system of the present invention in accordance with the disclosed structure.

FIG. 4 illustrates another embodiment of the road energy system of the present invention in accordance with the disclosed structure. In the present embodiment, a pressure plate 402 is embedded in the driveway 404 and the pressure plate 402 is coupled to at least one pressure sensor 406 inside the driveway 404. In the preferred embodiment, at least four sensors are disposed in the driveway 404. The pressure plate 402 may include piezoelectric elements which generate electricity when the plate 402 is compressed by the mechanical force exerted by vehicles on the pressure plate 402. The pressure sensors 406 are adapted to measure the amount of pressure being applied to the pressure plate 402 to assess the amount of power being generated and to detect the efficiency of the pressure plate 402. In the preferred embodiment, the weight of a vehicle can cause the pressure plate 402 to compress downward by about 0.10 inches to about 0.50 inches.

A turbine generator 408 is also included in the driveway embedded renewable energy generation system 400 and is adapted to spin when the pressure by vehicles is exerted on the pressure plate 402. The pressure plate 402 is designed to be compressed and/or move to spin the turbine generator 408. The turbine generator 408 converts the rotational energy into electrical energy. A combined battery and motor device 410 is coupled to the sensors 406 via connecting medium 412 and is directly coupled to the turbine generator 408. The combined battery and motor device 410 stores the electricity generated by the turbine generator 408 and is rotated using the mechanical energy received via the connecting medium 412.

The rotor shaft 414 and the power stator 416 can be the components of the turbine generator 408 and in combination help to convert the mechanical energy into the electrical power using the process of electromagnetic induction. The electrical power is stored in the power storage module 418 which can be in the form of a battery or another form of energy storage system. The power storage module 418 can be designed based on the size and power generating capacity of the pressure plate 402 and the turbine generator 408. A control box 420 monitors and controls the flow of electricity to power storage module 418 and to a grid from the power storage module 418.

Figure 5:
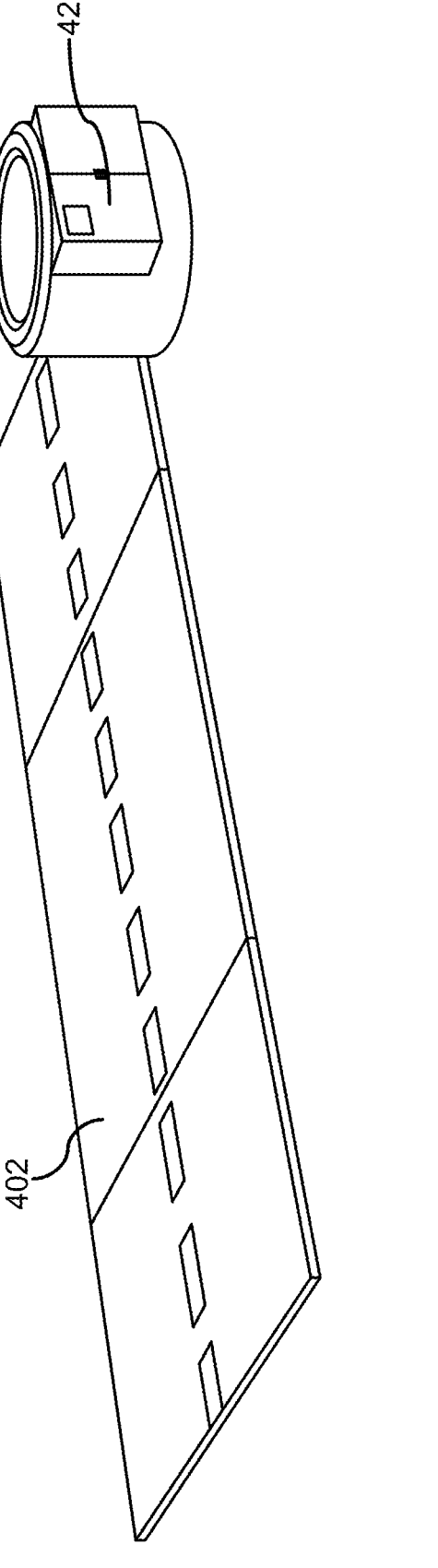
FIG. 5 illustrates a perspective view showing the visible components of the road energy system of FIG. 4 in accordance with the disclosed structure.

FIG. 5 illustrates a perspective view showing the visible components of the road energy system of FIG. 4 in accordance with the disclosed structure. As illustrated, only the pressure plate 402 and the control box 420 are visible from the outside to a user. All the other modules or components such as turbine generator 408, rotor 414, power shaft 416 and power storage module 418 are disposed inside the ground.

In one embodiment, the system 100, 400 can recharge a hybrid vehicle's battery while the vehicle is in a driving state. The vehicle is installed with a receiver device like RFID tags, Bluetooth, or Wi-Fi to pick up signals from the piezoelectric material. The vehicle is uniquely identified using vehicle IDs or a special communication protocol between the car and the road. A special charging port is added to the vehicle and energy received by the vehicle from the road is regulated. The battery charging is adjusted based on charging level of the battery of the vehicle.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "roadway-embedded electric energy generation system", "renewable energy system", "driveway embedded renewable energy generation system", "road energy system", and "system" are interchangeable and refer to the driveway embedded renewable energy generation system 100, 400 of the present invention.

Notwithstanding the forgoing, the driveway embedded renewable energy generation system 100, 400 of the present invention can be of any suitable size and configuration as is known in the art without affecting the overall concept of the invention, provided that it accomplishes the above stated objectives. One of ordinary skill in the art will appreciate that the driveway embedded renewable energy generation system 100, 400 as shown in the FIGS. are for illustrative purposes only, and that many other sizes and shapes of the driveway/roadway embedded renewable energy generation system 100, 400 are well within the scope of the present disclosure. Although the dimensions of the driveway/roadway embedded renewable energy generation system 100, 400 are important design parameters for user convenience, the driveway embedded renewable energy generation system 100, 400 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A roadway-embedded electric energy generation system comprising:
   a road energy tile;
   an energy storage module comprising a plurality of batteries housed within a fan powered cooling space configured to prevent overheating of the plurality of batteries;
   a plurality of flywheel generators;

wherein said plurality of flywheel generators are pressure actuated from a vehicle passing over a top surface of said road energy tile;
   wherein each of said plurality of flywheel generators rotates from downward said pressure of the vehicle passing over said top surface of said road energy tile;
   wherein each of said plurality of flywheel generators stores rotational energy in said energy storage module; and
   wherein the electric energy generation system is configured to automatically deactivate when said plurality of batteries are fully charged and when the road energy tile malfunctions.

2. The roadway-embedded electric energy generation system of claim 1, wherein said road energy tile is triangular.

3. The roadway-embedded electric energy generation system of claim 1, wherein each of said plurality of flywheel generators mounted to a vertex of said road energy tile.

4. The roadway-embedded electric energy generation system of claim 3, wherein said plurality of flywheel generators are connected to said energy storage module.

5. The roadway-embedded electric energy generation system of claim 4 further comprising a rotor shaft, wherein said rotor shaft coupled to said plurality of flywheel generators, and further wherein rotational motion of said plurality of flywheel generators turns said rotor shaft within a magnetic field.

6. The roadway-embedded electric energy generation system of claim 5, wherein said turning of said rotor shaft within said magnetic field creates electromagnetic induction.

7. The roadway-embedded electric energy generation system of claim 6, wherein said electromagnetic induction generates electrical current, and further wherein said electrical current is alternating current.

8. The roadway-embedded electric energy generation system of claim 1, wherein said energy storage module is connected to an external power grid for receiving said electrical current.

9. The roadway-embedded electric energy generation system of claim 8, wherein said energy storage module having a power button for manually activating and deactivating said electric energy generation system.

10. A roadway-embedded electric energy generation system comprising:
   a plurality of road energy tiles;
   an energy storage module comprising a plurality of batteries housed within a cooling space configured to prevent overheating of the plurality of batteries;
   a rotor shaft; and
   a plurality of flywheel generators;
   wherein said plurality of flywheel generators are pressure actuated from a vehicle passing over a top surface of said road energy tile;
   wherein each of said plurality of flywheel generators rotates from downward said pressure of the vehicle passing over said top surface of said road energy tile;
   wherein said rotor shaft is coupled to said plurality of flywheel generators;
   wherein rotational motion of said plurality of flywheel generators turns said rotor shaft within a magnetic field;
   wherein each of said plurality of flywheel generators stores rotational energy in said energy storage module; and
   wherein the electric energy generation system is configured to automatically deactivate when said plurality of batteries are fully charged and when the road energy tile malfunctions.

11. The roadway-embedded electric energy generation system of claim 10, wherein each of said plurality of flywheel generators mounted to a vertex of said plurality of road energy tiles.

12. The roadway-embedded electric energy generation system of claim 10, wherein said plurality of flywheel generators are connected to said energy storage module.

13. The roadway-embedded electric energy generation system of claim 12, wherein said turning of said rotor shaft within said magnetic field creates electromagnetic induction.

14. The roadway-embedded electric energy generation system of claim 13, wherein said electromagnetic induction generates electrical current, and further wherein said electrical current is alternating current.

15. The roadway-embedded electric energy generation system of claim 14, wherein said energy storage module connected to an external power grid for receiving said electrical current.

16. A method of generating electrical energy, the method comprising the steps of:

providing a plurality of road energy tiles, an energy storage module comprising a plurality of batteries, and a plurality of flywheel generators;

housing the energy storage module within a cooling space;

actuating said plurality of flywheel generators with pressure from a vehicle passing over a top surface of said plurality of road energy tiles;

rotating each of said plurality of flywheel generators from said pressure of the vehicle passing over said top surface of said plurality of road energy tiles; and storing rotational energy from each of said plurality of flywheel generators in said energy storage module; and wherein the energy storage module is configured to automatically deactivate when said plurality of batteries are fully charged and when the road energy tile malfunctions.

17. The method of generating electrical energy of claim 16 further comprising a step of providing a rotor shaft, wherein said rotor shaft coupled to said plurality of flywheel generators, and further wherein rotational motion of said plurality of flywheel generators turns said rotor shaft within a magnetic field.

\* \* \* \* \*